United States Patent Office 3,778,325
Patented Dec. 11, 1973

3,778,325
METHOD OF MANUFACTURING ARTIFICIAL LEATHER
Saburo Oohara, Kyoto, Koitsuro Amemiya, Osaka, Yasushi Nishijima, Hirakata, Mitsuyoshi Fukushima, Tondabayashi, and Kunio Shimizu, Settsu, Japan, assignors to Kanegafuchi Boseki Kabushiki Kaisha, Tokyo, Japan
Original application Aug. 11, 1970, Ser. No. 62,947, now Patent No. 3,677,871. Divided and this application Feb. 17, 1972, Ser. No. 226,573
Int. Cl. B32b 31/24
U.S. Cl. 156—278                                         11 Claims

ABSTRACT OF THE DISCLOSURE

Natural leather-like sheet materials of homogeneous microporous structure having high bending strength and excellent moisture-permeability and abrasion resistance, which are composed of four layers: a substrate layer of non-woven fabric finished with a synthetic butadienic rubber; a woven fabric layer; a microporous adhesive layer consisting of a specific polyurethane and conjoining the above-mentioned two layer; and a microporous grain layer consisting of another specific polyurethane which has a dynamic modulus of elasticity higher than that of the adhesive layer and covers uniformly the top surface of the woven fabric layer. An improved process for manufacturing such sheet materials, which comprises setting a woven fabric superimposed on a substrate, simultaneously with coagulating a grain layer polyurethane resin laid on the woven fabric, and an apparatus employed therefor are also proposed.

---

This is a division of application Ser. No. 62,947, filed Aug. 11, 1970, now Pat. No. 3,677,871.

The present invention relates to a natural leather-like material of homogeneous microporous structure having high bending strength and excellent moisture-permeability and abrasion resistance, more particularly to a natural leather-like material which is essentially composed of four layers: a grain layer having microporous structure of tough flexible polyurethane resin exhibiting excellent moisture-permeability; a woven fabric layer which is superimposed and adhered to the said grain layer and renders dimensional stability to the said material; a substrate layer comprising non-woven fabric and an adhesive layer of polyurethane resin binding together the said woven fabric layer and the said substrate; and to a method and an apparatus for manufacturing the same.

Heretofore, there have been proposed various natural leather-like materials and methods of manufacturing the same, for example, such as follows:

(1) A process comprising directly applying a polyurethane resin solution to a substrate for artificial leather such as a material obtained by binder-finishing of a non-woven fabric with a synthetic resin or natural or synthetic rubber latex, and forming film by means of a so-called wet coagulation method i.e., a method for coagulating and regenerating a resin by bathing said coated substrate in liquid which is non-solvent for the resin and miscible with the solvent of the resin solution, followed by washing and drying (Japanese patent application publication No. 4,673/1968).

(2) A process comprising applying a synthetic resin solution to a woven fabric, coagulating and regenerating the resin by means of a so-called dry coagulation i.e., a method of removing solvent by hot air dry, or a wet coagulation method as above, to form a grain layer in advance and thereafter sticking the thus formed grain layer onto a substrate of non-woven fabric with an adhesive.

(3) A process comprising bonding beforehand a substrate of non-woven fabric to a woven fabric with an adhesive, laying a synthetic resin solution for grain layer thereon, coagulating the resin by means of dry or wet coagulation method, washing and drying it.

(4) A process comprising impregnating a piled or napped fabric with synthetic resin solution, subjecting the impregnated fabric to a wet coagulation treatment, superimposing, without drying, the resultant fabric onto a non-woven fabric having synthetic resin solution previously impregnated therein, and immediately thereafter subjecting the combined fabrics to a wet coagulation and regeneration treatment followed by washing and drying (Japanese patent application publication No. 3,718/1966).

(5) A process comprising superimposing a woven fabric on a substrate of non-woven fabric, coating a resin dispersion thereon, permeating the said dispersion through the woven fabric into the inner part of the substrate by means of suction from under side of the substrate and subsequently coagulating and regenerating the resin by a wet method followed by washing and drying (U.S. Pat. No. 3,418,198).

However, the product obtained according to the process (1) above has low tear strength and poor dimensional stability which leads to a drawback of deformation of the product.

According to the process (2) above, there are seen numerous drawbacks such as many difficulties encountered in bonding the substrate with the woven fabric, a considerable limitation with respect to selection of the applicable adhesive from the standpoints of its low temperature characteristics and flexibility, and erosive action of the solvent for adhesive acted on the formed grain layer, which causes degradation in moisture permeability and roughening of the grain layer surface.

In the aforementioned process (3), when the substrate and the woven fabric are bonded with each other through the dry coagulation method, an intermediate layer of non-porous film is formed between the substrate and the grain layer, so that a discontinuity in microporosity which leads to a degradation of moisture-permeability of the product is resulted. On the other hand, when the bonding is performed by the wet coagulation method, the process requires intricate and cumbersome steps.

The above-mentioned method (4) involves a problem such that it is difficult to provide the surface of the product with smoothness, because the surface of the non-woven fabric to be laid with the grain resin is rough and accordingly, it is necessary to thicken remarkably grain layer in order to form a smooth surface.

Further, in the process (5), there is also a problem in regard to surface smoothness of the grain layer, wherein the amount of resin solution drawn into the substrate by suction means differs in different parts because of difference in size of pores existing on the surface of the substrate. Moreover, the artificial leather thus obtained according to instant process is not always satisfactory because it does not show natural leather-like breaks or cockles due to the identity of the resins used in the grain layer and the adhesive layer.

We, the inventors have conducted extensive, systematic investigations concerning a method of manufacturing a natural leather-like sheet material eliminating the above various drawbacks and have accomplished this invention.

The object of this invention is to provide an artificial leather material resembling closely natural leather having excellent moisture-permeability, abrasion resistance, bending strength, dimensional stability, surface smoothness, homogeneity and antidelaminating property.

Another object of the invention is to provide a natural leather-like artificial leather material showing break or cockles appearance closely resembling that of natural leather on bending an addition to the above many properties, especially improved sheet materials suitable for shoes, bags, belts, outer wears, accessories, interior decorations, upholsteries such as chair coverings and the like.

Another important object of the invention is to provide a novel method for obtaining easily the above material on industrial scale by means of simple steps and its apparatus used therefor.

Further objects of the invention will be apparent from the following description.

The process of the present invention is characterized by applying an organic solvent solution of a linear polyurethane resin to a substrate of non-woven fabric to form a homogeneous adhesive layer thereon, superimposing a woven fabric on the said adhesive layer, further applying homogeneously an organic solvent solution of a linear polyurethane for a grain layer to the said woven fabric while coagulation of the said adhesive layer due to elimination of the solvent does not take place, thereby forming a four-layer laminate, thereafter immersing the said laminate in a liquid being non-solvent for the said linear polyurethane resin and miscible with the said organic solvent, and coagulating simultaneously the polyurethane resins in both the adhesive layer and the said grain layer. Namely, the principal feature of this invention is to accomplish a step of setting a woven fabric superimposed on and adhered to a substrate for artficial leather simultaneously with a step of coagulating a grain layer resin laid on the said woven fabric.

The substrate to be employed in this invention is obtainable by: random webbing one or more kinds of fibers selected from the group consisting of synthetic fibers such as polyamide, polyester, polyacrylonitrile fibers and the like; natural fibers such as cotton and regenerated fibers such as viscose rayon staples and the like; needle-punching the formed random web to form a non-woven fabric; and, subjecting the thus obtained non-woven fabric to a binder-finishing treatment with a synthetic resin or natural or synthetic rubber latex. Particularly a preferred substrate is provided by: impregnating the said non-woven fabric with 50–350% by weight, preferably 100–250% by weight based on the fabric of liquid comprising an aqueous dispersion of synthetic butadienic rubber such as styrene/butadiene copolymer and the like, a vulcanizing agent, and a vulcanization accelerator; vulcanizing the impregnated fabric by vapor heating; washing and heating; and belt-sanding to smooth the surface of the resultant sheet material.

As woven fabric to be employed in this invention, mention may be made of those woven with cut staples or filament yarns of synthetic fibers such as polyamide, polyester, polyacrylonitrile fibres and the like, natural fibers such as cotton and regenerated fibers such as viscose rayon staples. The main object of employing the woven fabrics is to preserve dimensional stability of the article obtained from the natural leather-like structure, and otherwise, there is no limitation with respect to their physical properties.

By the linear polyurethane resin for grain layer to be employed in the invention is meant a polyurethane segment elastomer, preferably having terminal alcoholic groups, constituted of three components, i.e., an organic diisocyanate, a polyester having hydroxyl groups on its both terminals which is obtained from a polymethylene glycol and an organic dicarboxylic acid, and a glycol as a chain-extender. This may be produced either by a prepolymer method comprising preparing in advance an isocyanato-terminated prepolymer by reacting 1 mol of a polyester having terminal hydroxyl groups with 3 to 6 mols of an organic diisocyanate, dispersing the prepolymer in a solvent for polyurethane resin and adding 2–5 mols of a glycol thereto to effect further polymerization, or by a one-shot method comprising incorporating the above-mentioned three components in a solvent for polyurethane resin and immediately polymerizing them. In this case, polymerization is accomplished by employing stoichiometrically fewer hydroxyl groups than isocyanato groups to attain a predetermined viscosity, when the polymerization reaction is stopped by addition of a polymerization stopper or inhibitor having active hydrogen atoms capable of reacting with isocyanato groups. As the organic diisocyanate compound, which is one of the resin components for grain side, there may be preferably mentioned aromatic and cycloaliphatic diisocyanate compounds, for example, tolylene-2,4-diisocyanate, tolylene-2,6-diisocyanate, diphenylmethane-4,4'-diisocyanate, 1,5-naphthylenediisocyanate, paraxylenediisocyanate, 4,4'-methylene-bis (cyclohexylisocyanate) and the like, among which the most preferable is diphenylmethane-4,4'-diisocyanate. By the polyester having terminal hydroxyl groups which is one of the resin components for grain side is meant a polycondensation product of a polymethylene glycol and an organic dicarboxylic acid. As a representative glycol, mention may be made of ethylene glycol, propylene glycol, tetramethylene glycol, hexamethylene glycol or the like which may be employed solely or in combination. The most preferable is ethylene glycol alone or a mixture of ethylene glycol and propylene glycol. Representative organic dicarboxylic acids include succinic acid, adipic acid, sebacic acid, terephthalic acid and the like, among which the most preferable is adipic acid. A desirable average molecular weight of the polyester having terminal hydroxyl groups obtained by polycondensation of the said glycol and the said organic dicarboxylic acid is in a range of 1,000 to 3,000, more preferably 1,500 to 2,500. As glycol to be used for chain-extender which is one of the resin materials for grain side, either ethylene glycol or tetramethylene glycol is suitable.

Further, any mono-functional compound having active hydrogen atom may be generally employed as a polymerization stopper from the theoretical point of view, and according to investigations made by the inventors, it has been found out that solution of a polymer differs remarkably in its performances depending on the terminal group of the stopper. For example, when an alcohol is employed as a polymerization stopper, the resultant resin solution shows excellent defoaming ability, which provides a grain layer having smooth surface and a film having a gloss after coagulation and regeneration. In this case, however, rate of desolventation is not so high. When an amine is employed as the polymerization stopper, the obtained resin solution is remarkably rapid in desolventation, but is not good in defoaming ability, so that it is difficult to form a film having smooth surface required for the grain layer.

Further, in the case of solution predominantly comprising a polyurethane having terminal hydroxyl groups, the solution itself exhibits similar properties to those of solution comprising a polymer having terminal alcoholic residue, but a coating solution prepared by further incorporating therewith various compounds or additives exhibits decreased desolventation rate as compared with the latter.

As described hereinabove, performances of polymer solution comprising predominantly polyurethane vary greatly depending on nature of the terminal groups of said polyurethane. Since it was conceived that the variation in performances might be influenced by existence of an excess amount of a polymerization stopper, comparison was made with regard to performances between a polymer solution prepared by adding an amine to a polymer which had been produced using an alcohol as a stopper and a polymer solution prepared adversely by adding an alcohol to a polymer which had been produced using an amine as a stopper, and it was clarified that performances of both the polymer solutions were influenced only by the polymerization stopper employed at the first stage, which evidenced the fact that they depended upon nature of the terminal groups of the polymer. Namely, it is apparent from the above finding that a monoalcohol is preferred as a polymerization stopper for grain side resin.

The average molecular weight of the above-mentioned polyurethane elastomer is preferred to be as high as possible where the desolventation rate of the resin solution permits, since the grain side of the article requires high fatigue resistance, that is, viscosity of the resin solution containing 35% by weight of solid content is suitably in a range of 50,000 to 200,000 cps. at 30° C., preferably 70,000 to 150,000 cps. at 30° C.

The polyesterpolyol i.e., a raw material for the grain layer resin of this invention can afford, without lowering the coagulation and regeneration rate of the polymer solution, a grain side provided with necessary properties such as high modulus of elasticity and scratch resistance.

As for the modulus of elasticity required for the above mentioned resin, it has been ascertained that a dynamic modulus of elasticity determined at 30° C. and at a frequency of 11 cycles by using Vibron DD VII type tester with respect to film of 0.1 mm. thick formed according to the so-called dry coagulation method is preferably in a range of $4.0 \times 10^8$ to $1.5 \times 10^9$ dyne/cm.$^2$, more preferably $4.7 \times 10^8$ to $1.0 \times 10^9$ dyne/cm.$^2$, most preferably $5.0 \times 10^8$ to $7.5 \times 10^8$ dyne/cm.$^2$. When the dynamic modulus of elasticity is less than $4.0 \times 10^8$ dyne/cm.$^2$, the resultant resin is too soft and easily damaged and therefore, it is not always suitable for the grain layer. When the dynamic modulus of elasticity is in excess of $1.5 \times 10^9$ dyne/cm.$^2$, the resultant resin becomes hard and its fatigue resistance (bending strength) is appreciably lowered, so that it cannot some times be employed for the leather-like structure.

The thus obtained water-miscible solvent solution of polyurethane may be added with one or more kinds of different polymers which are soluble in the said solvent, such as polyvinyl chloride, polyacrylonitrile, polyacrylic acid and copolymers thereof, as a minor component.

In the process of the present invention, polymer or polymers comprising predominantly polyurethane as described above are employed in the form of an organic solvent solution. As the representative solvent, there may be employed solely or in combination, for example, N,N'-dimethylformamide, N,N'-dimethylacetamide, dimethylsulfoxide or the like. A diluent or thinner such as acetone, methylethylketone, tetrahydrofurane, dioxane and the like may also be employed as far as it does not coagulate the said polymer.

The coating solution to be employed to form grain layer is a viscous solution in the above mentioned organic solvent of a polymer comprising predominantly the aforementioned polyurethane, or that incorporated with urea or thiourea, a coloring agent such as dye and pigment, a light stabilizer, filler e.g., talc, if required, and which is held in a liquid state at a temperature below 30° C.

In order to facilitate the application of the solution to the woven fabric stuck onto the substrate, suitable viscosity of the coating solution is in a range of 5,000 to 150,000 cps. at 30° C., preferably 20,000 to 100,000 cps. at 30° C.

The linear polyurethane resin to be employed as an adhesive layer existing between the substrate comprising non-woven fabric and the woven fabric may be the same as that for grain layer, but in particular is desired to have the two preferable performances as follows:

(1) An ability of forming film according to so-called wet coagulation method and a formability of adhesive layer having microporous structure under the same coagulation condition as that of grain resin.

(2) A good adhesiveness to the substrate, particularly to its binder.

Here, the above-mentioned performance (1) is a desirable condition in order not to reduce moisture-permeability required for artificial leather, and the performance (2) serves to enhance adhesiveness between the substrate and the woven fabric, which is one of the objects of this invention.

In the case where the non-woven fabric finished with butadienic rubber binder is employed as the substrate, which is the most preferable embodiment of this invention, it is required that a special consideration be paid for selection of linear polyurethane resin to be employed as the adhesive layer in order to satisfy the above performance (2), as polyurethane resin is generally poor in adhesiveness to butadienic rubber.

With respect to the resin for adhesive layer having the above performances, the present inventors have investigated systematically and found out that suitable is a polymer having both terminal hydroxyl groups which is produced from an organic diisocyanate, a hydroxyl group terminated polyol having at least one ether linkage in its main molecular chain and a glycol.

As the organic diisocyanate compound, i.e., one of the resin components for the adhesive layer of this invention, there may be mentioned aromatic and cycloaliphatic diisocyanates, such as tolylene-2,4-diisocyanate, tolylene-2,6-diisocyanate, diphenylmethane-4,4'-diisocyanate, 1,5-naphthylenediisocyanate, paraxylenediisocyanate, dicyclohexyl-4,4'-diisocyanate and the like.

As the hydroxyl group terminated polyol having at least one ether linkage in its main molecular chain, mention may be made of a polyester polyol obtainable by polycondensation of a glycol having ether linkage and an organic dicarboxylic acid, and a polyether polyol. The representative glycol employed in the former is selected from the group consisting of diethylene glycol and dipropylene glycol. The representative dicarboxylic acid is selected from the group consisting of succinic acid, sebacic acid and adipic acid. The representative example of the latter is polyethylene glycol, polypropylene glycol or polytetramethylene glycol, of which preferable average molecular weight is in a range 1,000 to 3,000, more preferably 1,500 to 2,500.

Further, many artificial leathers heretofore proposed have a drawback of not generating natural leather-like breaks or cockles on bending part. In other words, natural leathers may be easily distinguished from artificial leathers by appearance of generated breaks on bending. Natural leathers generate many fine breaks in a perpendicular direction to bending direction, while artificial leathers generate only one thick break. Accordingly, in the former, stress by tension or compression exerted on bending part is dispersed, but in the latter, stress is concentrated on one place. As a result, remarkable difference in bending strength between them is seen. Thus many attempts have been made to manufacture such a structure as to generate natural leather-like breaks from the standpoint of appearance and mechanical property.

The present inventors have discovered, during investigation for improving adhesiveness, that by differentiating appropriately moduli of elasticity of a resin for grain layer and of a resin for adhesive layer, natural leather-like breaks can be generated on the surface of the article. Namely, by selecting for the former a resin having an excellent desolventation property and a somewhat higher modulus of elasticity than the latter, there is obtained an article exhibiting behaviors on bending similar to natural leather.

If it is contemplated only to provide a resin for adhesive layer with modulus of elasticity lower than that of a resin for grain layer, it can be attained by producing a polyurethane resin having low content of organic diisocyanate. However, rate of coagulation and regeneration is remarkably lowered as the diisocyanate content is decreased, which consequently involves many problems in the manufacture of natural leather-like structure, such that washing requires a long period of time and if the washing is insufficient, there is caused roughness on the surface of grain layer during drying step. Therefore, the above-mentioned method is neither preferred to lower the modulus of elasiticity of the resin for adhesive layer, nor satisfies the requisite (1) as described hereinabove.

In order to obtain a polyurethane resin for adhesive layer having the same or higher rate of coagulation and regeneration as compared with the resin for grain layer, it is necessary to maintain the organic diisocyanate content same as or higher than that of polyurethane resin for the grain layer. Under such conditions, a polyurethane resin having comparatively low modulus of elasticity may be obtained by employing a polyol containing at least one ether linkage in its main molecular chain as a raw material.

A polyurethane resin having terminal hydroxyl groups obtained from a polyol containing ether linkage possesses better adhesiveness to synthetic butadienic rubber than a polyurethane resin having no ether linkage in its main molecular chain.

Accordingly, by employing a polyol containing ether linkage in its main molecular chain as a raw material, there may be obtained a polyurethane resin having a relatively low modulus of elasticity together with an excellent adhesiveness to the said binder rubber of non-woven fabric without decreasing the rate of coagulation and regeneration.

The only one chain-extender as a raw material of polyurethane resin for adhesive layer employable in the process of this invention is 1,4-tetramethylene glycol which satisfies those desirable requisites.

Physical properties of a polymer is influenced greatly by its end group, in other words, by class of a polymerization stopper as described above. From this point of view, it is a polyurethane resin having terminal hydroxyl groups that exhibits excellent adhesiveness to the synthetic butadienic rubber binder of the substrate. Therefore, as a polymerization stopper for the said polyurethane resin, glycols are employed. Stoppers provide hydroxyl groups to the both ends of the polymer, represenative examples of which are ethylene glycol, propylene glycol, 1,4-tetramethylene glycol and 1,6-hexamethylene glycol. The most preferable among the above are propylene glycol and 1,4-tetramethylene glycol which react rapidly with isocyanato groups.

Though a bifunctional glycol acts as a chain-extender in the polymerization reaction, it can also effectively act as an inhibitor to stop the polymerization when its excess amount is added at once to the polymerization system, whereby stoichiometric equivalent relationship between isocyanato groups and hydroxyl groups is lost.

The greater the number of terminal groups per unit weight is, the higher is the adhesiveness of the above mentioned polyurethane resin. Further, it has been already described hereinabove that an organic solvent solution of resin to be applied as the adhesive layer should have a coagulation rate as high as possible, and however, the coagulation rate depends on the average molecular weight of the resin, namely the former is higher as the latter is smaller. This fact coincides with such requirement with respect to adhesiveness that content of terminal groups of polymer is preferred to be higher. Accordingly, it is preferable that the degree of polymerization is as low as possible to the extent where various physical properties permit.

According to the inventors' investigation, average molecular weight of the said polyurethane resin for adhesive layer, which is represented by the viscosity at 30° C. of its 35% solution, is preferably in a range of 8,000 to 130,000 cps., more preferably 20,000 to 100,000 cps.

The polyurethane resin for adhesive layer to be employed in this invention is also obtainable by either the prepolymer process or the one-shot process as described hereinbefore under the same conditions as those of the resin for grain layer.

The composition of the linear polyurethane resin for adhesive layer to be prepared may be determined appropriately in relation to the employed resin for grain layer in such a manner that the dynamic modules of elasticity of the said resin is preferably brought into a range of $3.0 \times 10^8$ to $1.0 \times 10^9$ dyne/cm.$^2$, more preferably $3.5 \times 10^8$ to $8.0 \times 10^8$ dyne/cm.$^2$. The best result is attained when the polyurethane resin of adhesive layer has a dynamic modulus of elasticity of $3.7 \times 10^8$ to $5.0 \times 10^8$ dyne/cm.$^2$ and is lower than that of the resin for grain layer employed in combination by at least $1.0 \times 10^8$ dyne/cm.$^2$.

The representative organic solvents for the polyurethane resin for adhesive layer to be employed in this invention include N,N-dimethylformamide, N,N'-dimethylacetamide, dimethylsulfoxide and the like. A diluent or thinner such as acetone, methylethylketone, tetrahydrofurane, dioxane and the like may also be added to the solvent as far as it does not cause the said polymer to coagulate.

The coating solution to be applied to the substrate is prepared by diluting merely an organic solvent solution of the said polyurethane with the above mentioned solvent, or by incorporating with the said solution urea, thiourea, a filter such as talc, a neutral salt such as sodium sulphate, sodium chloride, calcium carbonate or the like, and further admixing a pigment or dye therewith as the case may be. Such solution preferably preserves a liquid state at a temperature below 30° C. for a long time and in order to facilitate its application onto the substrate, it desirably has a viscosity at 30° C. in a range of 5,000 to 50,000 cps., more preferably 8,000 to 30,000 cps. Here, it is preferred that the resin solution for adhesive layer has a resin content of 10 to 40% by weight.

As a coagulation bath to be employed in the process of the invention, suitable is a liquid which is non-solvent for the said linear polyurethane resin and miscible with the said organic solvent, for example, water, an aqueous solution of an inorganic salt and an organic solvent being non-solvent for the polyurethane resin and miscible with the solvent of the resin solution.

As the said inorganic salt there may be employed sodium chloride, aluminum chloride, ammonium chloride, sodium sulphate, ammonium sulphate, aluminum sulphate or the like, alone or in combination and urea or thiourea may also be added thereto, if required.

Optimum concentration of the aqeuous solution of the salt employed in the coagulation bath ranges as follows:

| | G./l. |
|---|---|
| Sodium chloride | 200–300 |
| Aluminum chloride | 200–450 |
| Ammonium chloride | 100–250 |
| Sodium sulphate | 200–300 |
| Ammonium sulphate | 150–350 |
| Aluminum sulphate | 100–200 |

In the case that urea or thiourea is employed together with the salt solution, the concentration of the aqueous solution is appropriately selected to be in a range of 100 to 350 g./l., depending on the nature and concentration of the inorganic salt in the coagulation bath. As a suitable organic solvent to be employed in said coagulation bath, there may be mentioned alcohols such as methanol, propanol and the like and ketones such as acetone, methylethylketone and the like.

As above described, various kinds of composition may be employed for the coagulation bath and a particularly preferred composition is an aqueous solution of an inorganic salt or a combination of the said aqueous solution with urea or thiourea. The bath temperature for coagulation and regeneration is preferably in a range of 25 to 55° C., and in particular, 30 to 40° C.

In practice of the process of this invention by using an apparatus, the operative embodiment will be described hereafter. At first, a coating solution of resin for adhesive layer is laid on a substrate in such an amount that the finished thickness may be approximately 0.05 to 0.2 mm., taking into consideration the fact that the coating amount depends on the solid content in the solution. Next, a woven fabric is stuck thereon. A coating solution for grain layer is further applied thereto at the time when a part of the said coating solution for adhesive layer exudes on the surface of the said woven fabric. The coating amount depends on the solid content in the solution and therefore, is regulated so that the finished thickness of grain layer may be in a range of 0.2 to 0.5 mm. At this stage of production, if the woven fabric is coated with the resin solution for grain layer before the resin for adhesive layer exudes on the surface of the woven fabric, it is not preferable because air contained in the texture of the woven fabric rises into the grain layer resulting in formation of macropores or pinholes therein.

Preferred ranges of modules of elasticity respectively of the resin for grain layer and of the resin for adhesive layer have been described hereinabove. It is most preferable that the modulus of elasticity of grain resin is higher than that of adhesive resin by at least $1.0 \times 10^8$ dyne/cm.$^2$.

After coagulation and regeneration, washing is conducted repeatedly followed by drying.

An apparatus to be adapted for the practice of the process of this invention comprises a means for applying resin solution for adhesive layer onto a substrate, a means for superimposing a woven fabric thereon, a means for further applying a resin solution for grain layer onto the woven fabric stuck to the substrate, and a means for feeding it into a coagulating bath to effect simultaneous coagulation of both the adhesive resin and the grain resin. When the process of the present invention is practiced using such an apparatus, problems involved are what types of device should be employed in the respective applications of the adhesive resin and of the grain resin, and how the relative arrangement of those devices should be.

Coater devices adaptable for the practice of the process of this invention include all of conventional coater devices, for example, a top-feed reverse roll coater, bottom-feed reverse roll coater, knife roll coater, gravure roll coater, direct three roll coater, knife belt coater, kiss roll coater, dip coater, floating knife coater, opposite knife coater, inverse knife coater, air knife coater and among which the reverse coater is most desirable. Neither a knife coater nor a gravure coater is so desirable, because in the former, dust, gelled urethane, etc. sometimes accumulate on the tip of the knife blade, which causes to form longitudinal stripes on the coated surface, and in the latter, the applied amount of solution is too small.

Further, in the present invention, the coater device should be selected or designed after due consideration of the fact that the woven fabric is not firmly fixed to the substrate by an adhesive but floating on the adhesive and that the adhesive is exuded to the top surface of the woven fabric. From such a point of view, the two reverse roll coater is more preferable than the three reverse roll coater for a coater for grain layer, because in the latter, the woven fabric not fixed to the substrate cannot endure against shearing stress between coating roll and backing roll which causes a strain of the woven fabric. The kiss coater is difficult to form a smooth surface. On the other hand, the application of adhesive layer to the substrate has an uneven thickness, the two reverse roll coater results in an uneven coat which causes partial separation between the woven fabric and the substrate and therefore, the three reverse roll coater is more suitably employed.

The apparatus of the present invention will be illustrated referring to the accompanying drawings.

Now, a relative arrangement between the three reverse roll coater and the two reverse roll coater, and an operation for sticking the woven fabric to the substrate will be explained.

Figure 1:
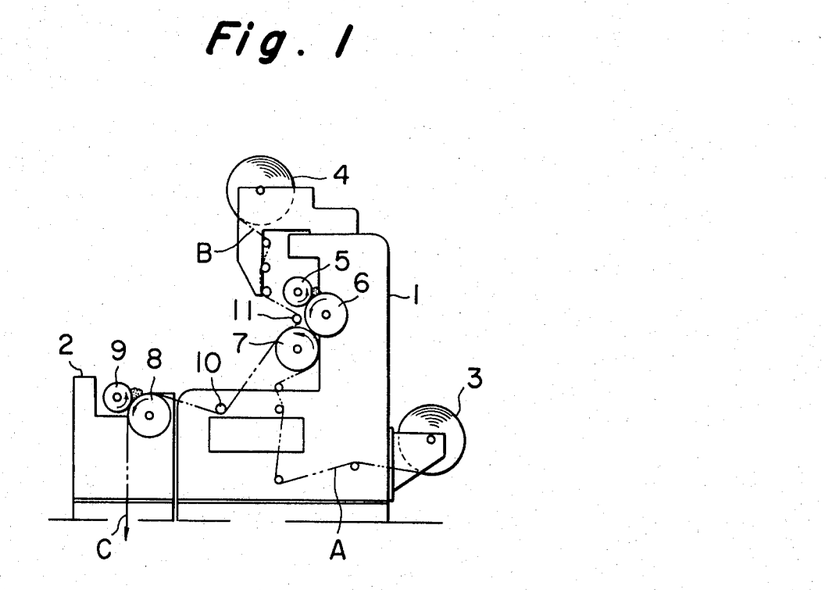
FIG. 1 is a side elevational view showing an embodiment of the apparatus adapted for practising the process of the present invention.
Figure 2:
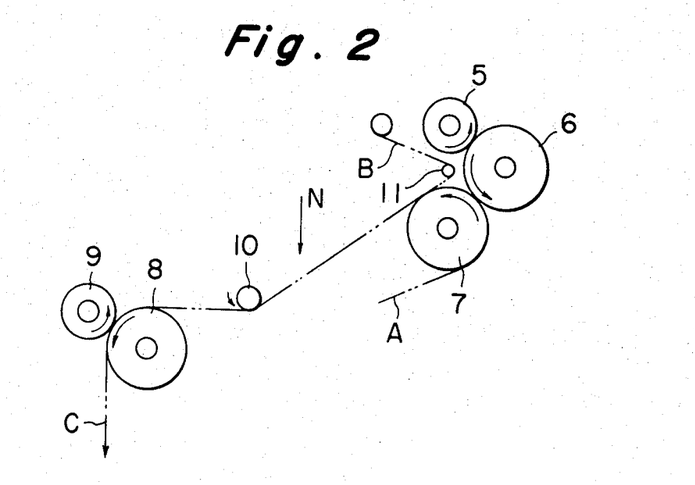
FIG. 2 is a side view showing an essential part of another embodiment of the apparatus of the invention.

In FIG. 1 wherein the guide roll 10 for sticking a woven fabric to a substrate is located midway between three reverse roll coater 1 and two reverse roll coater 2, and arranged at a considerably deep position below the common tangent of the bed roll 8 of the two reverse roll coater and the backing roll 7 of the three reverse roll coater when the guide roll 10 is rotated, the adhesive resin exuded onto the top surface of the woven fabric not only stains the face of the roll but since the solvent for the resin is absorbed by the woven fabric, the exuded resin solution increases its tackiness and the increased tackiness of the resin adhered to the roll tends to cause the woven fabric and the substrate once stuck together to separate while passing on the guide roll. Also in FIG. 2 wherein the guide roll 10 is arranged at a position slightly below the common tangent of the bed roll 8 and the backing roll 7, the separation as above often occurs when the roll 10 is rotated. When the roll 10 is immobilized, dust or gelled urethane accumulates on the side surface of the roll shown by the arrow mark in FIG. 2, which makes impossible to obtain a smooth grain face. Also when sticking is conducted by means of the guide roll 10 as shown in the N mark in FIG. 2, it is difficult to obtain a smooth grain face for the same reason as the above.

Figure 3:
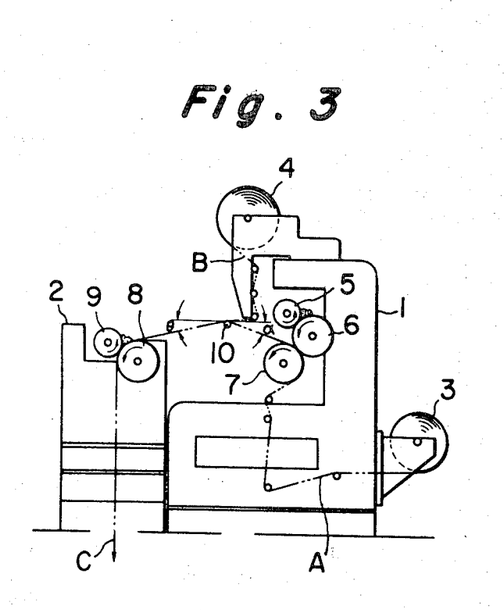
FIG. 3 is a side elevational view further showing another embodiment of the apparatus of the present invention.

The most preferred apparatus adaptable for practising the process of the invention is such an apparatus shown in FIG. 3, wherein the bed roll 8 of the two reverse roll coater 2 is located at the same elevation with the backing roll 7 of the three reverse roll coater 1 and the guide roll 10 is contacted with and pressed against the substrate from the under side. In that case, the degree of contact is adjusted by a position of the guide roll and it is suitable that the angle $\theta$ is in a range of about 5 to 45°, more preferably 15 to 30°. Thickness of grain layer is determined by the distance between the bed roll 8 of the two reverse roll coater 1 and the metal roll 9, so that the bed roll 8 made of hard chrome-plated metal is preferred to one made of rubber.

With reference to FIG. 3, the embodiment of the process for conducting sticking operation using the above apparatus is explained. The substrate is fed out through guide rolls from the feeding device 3, passed through between the rolls 6 and 7 where an adhesive is applied thereto, superimposed thereon with a woven fabric fed through guide rolls from the woven fabric feeding device 4, with a joining angle of $\alpha$. The substrate and the woven fabric are stuck together through the guide roll 10, and subsequently applied thereto a resin for grain layer at the nip of the bed roll 8 and the metal roll 9 of the two reverse roll coater 2. Then the sheet material thus coated with grain side resin is delivered to the next coagulation stage. Thus, an artificial leathers having highly moisture-permeable, smooth, tough grain layer can be produced advantageously on industrial scale.

The sheet material obtained according to the preferred embodiment of this invention comprising four layers: a substrate layer, an adhesive layer, a woven fabric layer and, a grain layer, wherein modulus of elasticity of the adhesive resin is relatively lower than that of the grain layer, resembles closely natural leathers in appearance, particularly appearance on bending and have such excellent performances so that it may be applied to the same use as natural leathers.

Namely, accordingly to the invention there can be obtained a natural leather-like structure comprising four layers of a grain layer, a woven fabric layer, an adhesive layer and a substrate layer, wherein drawbacks in common with conventional artificial leathers have been eliminated, natural leather-like break is generated in bending part, so that stress against tension and compression is dispersed and bending strength is remarkably improved. The present invention has its feature where, as the adhesive resin existing between the substrate and the woven fabric, there is employed a polyurethane resin of a relatively low average molecular weight containing at least one ether linkage in its main molecular chain and having both terminal hydroxyl groups that has good adhesiveness to synthetic butadienic rubber and further possessing lower elasticity and greater rate of coagulation and regeneration than the grain resin, while as the grain resin there is employed a polyurethane resin of a relatively high average molecular weight containing no ether linkage in its main molecular chain and having both terminal alcoholic residue that has a good defoaming ability which provides a smooth surface after coagulation and regeneration, and further having relatively higher elasticity than the said adhesive resin.

In this invention, breaks or cockles resembling closely natural leather may be generated on bending by employing a relatively soft resin for the adhesive layer and a relatively hard resin for the grain layer.

Prior to illustrations of this invention according to examples set forth hereinafter, Preparation Examples 1–7 of polyurethane resin solutions to be employed for a grain layer and an adhesive layer will be explained. The examples relate to manufacture of natural leather-like structures for which the resin solutions obtained in the said preparation examples are employed.

The term "part" described in both the preparation examples and the examples signifies "part by weight."

Measurements are conducted in accordance with the following test methods:

(1) Separation strength of a substrate from a woven fabric is determined in the following manner by using Instron TM–M type tester (manufactured by Instron Co. Ltd.). A specimen of 2.5 cm. wide and 15 cm. long is peeled forcibly by 5 cm., put on the tester at the clamp distance of 5 cm. and peeled at a speed of 10 cm./min. by 10 cm. separation strength is represented by an average value of three maxima and three minima.

(2) Moisture-permeability is determined as follows and represented by an amount of water (mg.) passed through a sample of 1 cm.$^2$ for 1 hour: A sample is placed on an aluminum cup containing calcium chloride, sealed perfectly with paraffins and subsequently left to stand in an atmosphere of 80% R.H. at 30° C. for 3 hours, and amount of water absorbed by calcium chloride is measured.

(3) Dynamic modulus of elasticity: A 20% N,N'-dimethylformamide solution of polyurethane resin is prepared, casted with a thickness of 1.5 mm. on a glass plate, heated at 60° C. for one hour and further heated at an elevated temperature of 80° C. for 3 hours while sucking with aspirator to result a translucent, dry film of about 0.1 mm. thick. This film is set onto Vibron DD VII type tester and a graph showing dependency of dynamic modulus of elasticity at 30° C. is read.

(4) Generation of breaks was observed in naked eyes by bending a sample.

(5) Bending strength was measured by employing Flexiometer (manufactured by Yasuda Seiki Seisakusho Co.) wherein bending was applied on a sample in 90 cycles per minute.

PREPARATION 1

In a polymerization reactor equipped with nitrogen gas flow apparatus, 72.9 parts of polyethylene glycol adipate (EGA) of an average molecular weight of 2,056 having both terminal hydroxyl groups and 44.1 parts of 4,4'-diphenylmethan diisocyanate flake were reacted at 80° C. for 3 hours and a prepolymer was obtained. After cooling to 30° C. this was dissolved in 194.6 parts of N,N'-dimethylformamide containing 0.012% of water and then added with 44.9 parts of 1,4-tetramethylene glycol while stirring. Reaction was carried out at 30° C. for one hour and then temperature was elevated up to 60° C. requiring 30 minutes 3 hours 10 minutes after the temperature had reached to 60° C., viscosity of the polymerization reaction solution reached 68,000 cps., when 46.3 parts of N,N'-dimethylformamide previously mixed with 2.4 parts of ethanol were added thereto to stop polymerization reaction. The thus obtained N,N'-dimethylformamide solution of polyurethane resin was a viscous, transparent solution having a viscosity at 30° C. of 98,000 cps.

PREPARATION 2

Polymerization reaction was conducted in a similar manner to Preparation 1, and was completed by adding: (a) a dispersion of 3.9 parts of 1,4-tetramethylene glycol in 46.3 parts of N,N'-dimethylformamide or (b) a dispersion of 2.2 parts of p-toluidine in 46.3 parts of N,N'-dimethylformamide (its excess amino group was neutralized by 3 parts of acetic acid after polymerization reaction had been completed) as a polymerization stopper to the reaction solution when viscosity of the said solution reached 70,000 cps. at 30° C. The obtained polyurethane resin solutions were viscous transparent solutions having viscosities at 30° C. of 95,000 cps. in the case of (a) and of 95,500 cps. in the case of (b).

PREPARATION 3

45 parts of EGA of an average molecular weight of 1,500 having both terminal hydroxyl groups were reacted with 37.5 parts of 4,4'-diphenylmethane diisocyanate flake while stirring in nitrogen gas stream by heating at 80° C. for 2 hours. The obtained prepolymer was dissolved in 192 parts of N,N'-dimethylformamide containing 0.012% of water and cooled to room temperature. To this solution were added 10.2 parts of 1,4-tetramethylene glycol and the reaction was further processed at 60° C. for 4 hours and 25 minutes. When viscosity of the reaction solution reached 69,000 cps., 2.5 parts of ethanol were added to stop polymerization. The obtained polymer solution was viscous and transparent, having a viscosity at 30° C. of 105,000 cps.

PREPARATION 4

39 parts of diethylene glycol adipate (DEGA) of an average molecular weight of 2,000 having both terminal hydroxyl groups were reacted with 23.6 parts of 4,4'-diphenylmethane diisocyanate while stirring in nitrogen gas stream by heating at 80° C. for 2 hours. The reaction product was dissolved in 130 parts of N,N'-dimethylformamide and cooled to room temperature. To this solution were added 6.4 parts of 1,4-tetramethylene glycol and the reaction was further conducted at 60° C. for 4 hours. When the reaction solution reached a viscosity of 70,000 cps. at 30° C., 1.7 parts of ethanol were added thereto as a polymerization stopper. The obtained polymer solution was a transparent solution having a viscosity at 30° C. of 97,000 cps.

PREPARATION 5

73 parts of EGA having an average molecular weight of 2,056 were reacted with 26.7 parts of 4,4'-diphenylmethane diisocyanate at 80° C. for 2 hours in nitrogen gas stream to produce a prepolymer. The prepolymer was dissolved in 194 parts of N,N'-dimethylformamide containing 0.012% of water and after cooling to room temperature, 6.2 parts of 1,4-tetramethylene glycol were added thereto as a chain-extender. Further reaction was conducted at room temperature for 30 minutes while stirring and then the temperature was elevated up to 70° C. requiring 30 minutes. The reaction was continued for 3 hours and 40 minutes at that elevated temperatures. When viscosity of the reaction solution reached 63,000 cps., 1.7 parts of ethanol were added to stop polymerization. Thus there was obtained a transparent, viscous polyurethane solution having a viscosity at 30° C. of 112,000 cps.

PREPARATION 6

89.1 parts of diethylene glycol adipate (DEGA) having both terminal hydroxyl groups and an average molecular weight of 2,038 and 14.5 parts of 1,4-tetramethylene glycol were dissolved in 236.4 parts of N,N'-dimethylformamide containing 0.015% of water, and then added with 54.1 parts of 4,4'-diphenylmethane diisocyanate flake while stirring in nitrogen gas stream. After complete dissolution of 4,4'-diphenylmethane diisocyanate, temperature was elevated at 60° C. requiring 30 minutes. Polymerization reaction was proceeded while stirring and 4.8 parts of 1,4-tetramethylene glycol dissolved in 53.5 parts of N,N'-dimethylformamide were added as a polymerization stopper to six fractions of reaction solution when each viscosity reached (a) 2,700 cps., (b) 3,500 cps., (c) 10,500 cps., (d) 22,000 cps., (e) 31,000 cps. or (f) 61,000 cps. Thus, each transparent polyurethane resin solution having (a) 6,300 cps./30° C., (b) 8,500 cps./30° C. (c) 25,000 cps./30° C., (d) 53,000 cps./30° C., (e) 78,000 cps./30° C. or (f) 103,000 cps./30° C. was obtained.

PREPARATION 7

Polyurethane resin solutions of compositions as shown in the following Table 1 were prepared in a similar manner to Preparation 6.

TABLE 1

| Number | Polyol Class | Polyol M.W. | Polyol amount in part | MDI, amount in part | 1,4-TMG, amount in part | Polmzn. stopper | Resin solution, viscosity (cps./30° C.) |
|---|---|---|---|---|---|---|---|
| a | EGA | 2,056 | 39.8 | 24.1 | 6.4 | 1,4-TMG | 38,500 |
| b | DPGA | 2,036 | 50.0 | 31.2 | 8.7 | 1,4-TMG | 70,500 |
| c | PTG | 1,500 | 50.0 | 31.3 | 7.77 | 1,4-TMG | 71,800 |
| d | PET | 2,473 | 62.0 | 18.8 | 4.98 | 1,4-TMG | 48,000 |
| e | PET | 1,500 | 50.0 | 37.5 | 10.6 | 1,4-TMG | 51,300 |

Note.—DPGA=Dipropylene glycol adipate; PTG=Polytetramethylene glycol.

EXAMPLE 1

To 100 parts of the polyurethane resin solution prepared in Preparation 1 were added 5.25 parts of urea, 3.5 parts of calcium carbonate, 0.7 part of carbon black and 10 parts of N,N'-dimethylformamide and the mixture was agitated thoroughly in a kneader at 60° C. for 2 hours to prepare a coating solution for grain layer having a viscosity at 30° C. of 75,000 cps.

On the other hand, 100 parts of the polyurethane resin solution prepared in Preparation 6(f) were added with 7 parts of calcium carbonate and 44 parts of N,N'-dimethylformamide and mixed thoroughly in a kneader at 60° C. for one hour to prepare a coating solution for adhesive layer having a viscosity at 30° C. of 14,000 cps.

To non-woven fabric for substrate comprising 30:70 of nylon and polyester fibers and bound by 150% of styrene-butadiene copolymer, the said coating solution for adhesive layer was applied by a three reverse roll coater in a finished thickness of 0.05 mm., then subsequently thereon was superimposed broad cloth woven with mixed spun yarn of polyester fiber/cotton, and at the time when said coating solution for adhesive layer was exuded out of the surface of the broad cloth, said coating solution for grain layer was applied thereto homogeneously by a two reverse roll coater in a finished thickness of 0.3 mm. Then immediately thereafter the laminated material was bathed in an aqueous solution of 250 g./l. of sodium sulfate and 200 g./l of urea for 10 minutes to effect simultaneous coagulation and regeneration of the adhesive layer and the grain layer, then washed with hot water, dried, embossed and top-coated to obtain a natural leather-like material. This material generates a break resembling closely natural leather on bending part and had a separation strength of the substrate from the woven fabric of 1.90 kg. in warp direction and 1.81 kg. in weft direction and a moisture-permeability of 3.7 mg./cm.$^2$/hr. Values of dynamic modulus of elasticity at 30° C. (frequency: 11 cycles) of the grain resin and adhesive resin were $6.1 \times 10^8$ dyne/cm.$^2$ and $4.2 \times 10^8$ dyne/cm.$^2$ respectively.

EXAMPLE 2

To respective 100 parts of the polyurethane resin solution obtained in Preparations 1, 2(a), 2(b) and 4 were added 7 parts of precipitated calcium carbonate and further added an appropriate amount of N,N'-dimethylformamide while mixing in a kneader at 60° C. so as to attenuate the viscosity at 30° C. of solution to about 15,000 cps. Thus obtained each solution was employed as a coating solution for adhesive layer and natural leather-like materials having the following physical properties were obtained in a similar manner to Example 1.

Table 2

| | Resin solution number | | | |
|---|---|---|---|---|
| | 1 | 2(a) | 2(b) | 4 |
| Polyol | EGA | EGA | EGA | DEGA |
| End group | —OEt | —OH | —NH—⟨⟩—CH$_3$ | —OEt |
| Viscosity of the original resin solution (cps./30° C.) | 98,000 | 95,000 | 95,500 | 97,000 |
| Dynamic modulus of elasticity of adhesive layer (dyne/cm.$^2$ at 30° C.) | $6.1 \times 10^8$ | $6.2 \times 10^8$ | $6.1 \times 10^8$ | $4.2 \times 10^8$ |
| Ratio of dynamic modulus of elasticity of grain layer to adhesive layer | 1 | 1 | 1 | >1 |
| Separation strength (kg./2.5 cm.): | | | | |
| Warp | 1.18 | 1.43 | 1.10 | 1.49 |
| Weft | 1.04 | 1.32 | 0.98 | 1.43 |
| Natural leather-like break | Not generated | Not generated | Not generated | Generated |
| Bending strength (300,000 cycles) | Cracked | Cracked | Not cracked | Not cracked |
| Moisture-permeability (mg./cm.$^2$ hr.) | 2.4 | 2.7 | 3.2 | 3.8 |

From above Examples 1 and 2, it is apparent that adhesive strength between the substrate and woven fabric is higher when as the adhesive resin, polyurethane prepared from a polyol having ether linkage or polyurethane having terminal hydroxyl groups is employed, and further particularly when polyurethane satisfies both the such conditions, a synergistic effect with respect to the adhesive strength is brought about.

EXAMPLE 3

To respective 100 parts of the polyurethane resin solutions of Preparations 6(a), 6(c), 6(d), 6(e) and 7(a) were added 7 parts of precipitated calcium carbonate, and further, when required, added N,N'-dimethylformamide while heating in a kneader at 60° C. in order to attenuate the viscosity at 30° C. of solution to about 8,000 cps. Thus obtained each solution was employed as a coating solution for adhesive layer and natural leather-like materials were produced in the similar manner to Example 1. The result is shown in Table 3.

the neighborhood of $2.2 \times 10^9$ dyne/cm.$^2$, bending strength is remarkably degraded since the resin itself is of plasticity, and accordingly, the upper limit of the dynamic modulus of elasticity of adhesive resin lies considerably below $2.2 \times 10^9$ dyne/cm. 2.

TABLE 3

| | Resin solution number | | | | | |
|---|---|---|---|---|---|---|
| | 6(a) | 6(b) | 6(c) | 6(d) | 6(e) | 7(a) |
| Polyol | DEGA | DEGA | DEGA | DEGA | DEGA | EGA |
| End group (resin) | —OH | —OH | —OH | —OH | —OH | —OH |
| Viscosity of the original resin solution (cps./30° C.) | 6,300 | 8,500 | 25,000 | 53,000 | 78,000 | 38,000. |
| Dynamic modulus of elasticity of adhesive layer (dyne/cm.$^2$ at 30° C.) | $4.0 \times 10^8$ | $4.1 \times 10^8$ | $3.9 \times 10^8$ | $3.8 \times 10^8$ | $4.1 \times 10^8$ | $6.3 \times 10^8$. |
| Ratio of dynamic modulus of elasticity of grain layer to adhesive layer. | >1 | >1 | >1 | >1 | >1 | 1. |
| Separation strength (kg./2.5 cm.): | | | | | | |
| Warp | 1.40 | 1.68 | 2.45 | 2.78 | 2.41 | 1.52. |
| Weft | 1.21 | 1.62 | 2.66 | 2.61 | 2.37 | 1.33. |
| Natural-leather like break | Generated | Generated | Generated | Generated | Generated | Not generated. |
| Bending strength (300,000 cycles) | Not cracked | Not cracked | Not cracked | Not cracked | Not cracked | Cracked. |
| Moisture-permeability (mg./cm.$^2$/hr.) | 4.3 | 4.1 | 4.1 | 4.2 | 3.9 | 3.9. |

From the result of Table 3 above, it is apparent that excellent adhesive strength is obtained when the original viscosity at 30° C. of 35% solution of resin is in a range of about 8,000–80,000 cps., preferably about 20,000–55,000 cps. It has also been confirmed that even if the original resin solution has a lower viscosity, adhesive strength is low when the polyol component has no ether linkage.

It is also apparent from Table 2 and Table 3 that natural leather-like break can be generated when the ratio of dynamic modulus of elasticity of grain resin to adhesive resin is greater than one.

EXAMPLE 4

The respective polyurethane resin solutions prepared in Preparations 7(c), 7(d) and 7(e) were diluted in N,N'-dimethylformamide to a viscosity at 30° C. of 20,000 cps. to prepare coating solutions for adhesive layer. Natural leather-like materials were produced according to the same manner as in Example 1. The result is shown in Table 4.

EXAMPLE 5

To respective 100 parts of the polyurethane resin solutions obtained in Preparations 2(a), 2(b), 3, 4 and 5, 10.5 parts of thiourea and 10.5 parts of precipitated calcium carbonate were added and mixed in a kneader at 60° C. and further diluted with N,N'-dimethylformamide to prepare a coating solution for grain layer having a viscosity of about 70,000 cps. at room temperature, respectively.

To 100 parts of the polyurethanes resin solution obtained in Preparation 7(b), 3.5 parts of calcium carbonate were added and the mixture was agitated in a kneader held at 60° C. and diluted with N,N'-dimethylformamide to prepare a coating solution for adhesive layer having a viscosity of about 15,000 cps. at room temperature.

To the substrate of non-woven fabric comprising viscose staples and polyester fibers in a ratio of 30:70 and

TABLE 4

| | Resin solution Number | | |
|---|---|---|---|
| | 7(c) | 7(d) | 7(e) |
| Polyol | PTMG | PTMG | PTMG |
| End groups | —OH | —OH | —OH |
| Viscosity of the original resin solution (cps./30° C.) | 71,800 | 48,000 | 51,300. |
| Dynamic modulus of elasticity of adhesive layer (dyne/cm.$^2$ at 30° C.) | $3.6 \times 10^8$ | $2.4 \times 10^8$ | $1.3 \times 10^9$. |
| Ratio of dynamic modulus of elasticity of grain resin of adhesive | >1 | >1 | <1. |
| Separation strength (kg./2.5 cm.): | | | |
| Warp | 2.25 | 1.72 | 4.10. |
| Weft | 2.49 | 1.58 | 3.76. |
| Natural leather-like break | Generated | Generated | Generated. |
| Bending strength (200,000 cycles) | Not cracked | Not cracked | Cracked.[1] |
| Moisture-permeability (mg./cm.$^2$/hr.) | 3.3 | 0.7 | 3.4. |

[1] From grain to adhesive layer.

NOTE.—PTMG = Polytetramethylene glycol.

From the result of Table 4, it is apparent that when dynamic modulus of elasticity of the adhesive resin is in the neighborhood of $2.4 \times 10^8$ dyne/cm.$^2$, the result is poor in moisture-permeability even if the ratio of dynamic modulus of elasticity of grain resin is higher than one. This fact means that in order to obtain a polyurethane resin of a dynamic modulus of elasticity in the neighborhood of $2.5 \times 10^8$ dyne/cm.$^2$ at 30° C., isocyanate content must be low, but in such a case desolventation rate is so low that moisture-permeability of the article is remarkably degraded.

On the other hand, it is also apparent that in the case of adhesive resin having a dynamic modulus of elasticity in bound with 200% by weight based on the fibers of styrene-butadiene copolymer, said coating solution for adhesive layer was applied by a three reverse roll coater in a finished thickness of 0.05 mm., immediately whereafter nylon gauze was superimposed thereon and when said adhesive resin solution exuded out of the surface of said woven fabric, said coating solution for grain layer was further applied thereto by a two reverse roll coater in a finished thickness of 0.3 mm. The thus laminated material was bathed in an aqueous solution containing 200 g./l. of sodium chloride and 400 g./l. of urea at 45° C. for 5 minutes to coagulate and regenerate the grain layer and the adhesive layer, subsequently washed with hot water, dried, embossed and top-coated. Thus natural leather-like materials were obtained. The result is shown in Table 5.

ample 1 by employing an aqueous solution of 40° C. containing 200 g./l. of ammonium sulphate and 250 g./l.

TABLE 5

| | Resin solution number | | | | |
|---|---|---|---|---|---|
| | 2(a) | 2(b) | 3 | 4 | 5 |
| Grain layer: | | | | | |
| Polyol | EGA | EGA | EGA | DEGA | EGA |
| End group | OH | —NH—⟨ ⟩—CH$_3$ | —OE$^2$ | —OE$^2$ | —OE$^2$ |
| Viscosity of the original resin solution (cps./30° C.) | 95,000 | 95,500 | 105,000 | 97,000 | 112,000. |
| Dynamic modulus of elasticity (dyne/cm.$^2$ at 30° C.) | 6.5×10$^8$ | 6.4×10$^8$ | 1.7×10$^9$ | 4.1×10$^8$ | 3.1×10$^8$. |
| Adhesive layer: | | | | | |
| Resin solution Number | | | 7(b) | | |
| Polyol | | | DPGA | | |
| End group | | | —OH | | |
| Viscosity of the original resin solution (cms./30° C.) | | | 70,500 | | |
| Dynamic modulus of elasticity (dyne/cm.$^2$ at 30° C.) | | | 3.6×10$^8$ | | |
| Article: | | | | | |
| Ratio of dynamic modulus of elasticity of grain resin to adhesive resin | >1 | >1 | >1 | >1 | <1. |
| Separation strength (kg./2.5 cm.): | | | | | |
| Warp | 2.23 | 2.34 | 2.31 | 2.29 | 2.18. |
| Weft | 2.10 | 2.39 | 2.47 | 2.18 | 2.35. |
| Natural leather-like break | Generated | Generated | Generated | Not generated | Not generated. |
| Bending strength (200,000 cycles) | Not cracked | Not cracked | Cracked | Not cracked | Not cracked. |
| Moisture-permeability (mg./cm.$^2$/hr.) | 1.5 | 3.4 | 1.5 | 3.1 | 0.9. |
| Condition of grain surface | Slightly poor | Poor defoamability of the grain layer solution. | | Easily scarred by scratch. | Poor. |

It is understood from Table 5 that grain resin having a dynamic modulus of elasticity in the neighborhood of 1.7×10$^9$ dyne/cm.$^2$ is nearly plastic, considerably hard and extremely poor in fatigue resistance, and the product from grain resin having a dynamic modulus of elasticity in the neighborhood of 3.1×10$^8$ dyne/cm.$^2$ is not good in the surface condition due to poor desolventation rate. Accordingly, it is concluded that dynamic modulus of elasticity of the grain resins must be in considerably narrower range than the range between the above two.

It is also apparent that in the case of grain resin having terminal hydroxyl groups, moisture-permeability is a little low and grain surface is slightly no good due to poor desolventation rate and furthermore, in the case of employment of an amine stopper, practical use is impossible owing to extremely poor defoamability of coating solution.

It shows that when the difference in dynamic modulus of elasticity between grain resin and adhesive resin is no more than about 0.5 dyne/cm.$^2$, natural leather-like break is not generated. It was also ascertained that an article from grain comprising polyurethane having ether linkage in its main molecular chain is easily scarred on the grain surface by scratching.

EXAMPLE 6

To 100 parts of the polyurethane resin solution obtainin Preparation 1 were added 17.5 parts of thiourea, 7.0 parts of calcium carbonate and 0.3 part of carbon black, further added 15 parts of N,N'-dimethylformamide and the mixture was kneaded in a kneader at 60° C. for 3 hours. Thus a coating solution for grain layer having a viscosity at 30° C. of 64,000 cps. was prepared.

To 100 parts of the polyurethane resin solution obtained in Preparation 6(f) having terminal hydroxyl groups were added 10.5 parts of calcium carbonate, 17.5 parts of thiourea and 55.0 parts of N,N'-dimethylformamide while stirring at 60° C. for 2 hours by a kneader and a solution for adhesive layer having a viscosity at 30° C. of 15,000 was prepared. A natural leather-like material was produced in the similar manner to Example 1 by employing an aqueous solution of 40° C. containing 200 g./l. of ammonium sulphate and 250 g./l. of sodium chloride as a coagulation bath liquid. The result is shown in Table 6.

TABLE 6

| | | |
|---|---|---|
| Thickness (mm.) | 1.43 | |
| Weight (g./m.$^2$) | 805 | |
| Apparent specific gravity (g./cm.$^3$) | 0.56 | |
| Surface hardness (degree) | 60 | |
| | Warp | Weft |
| Strength (kg./cm.$^2$) | 0.95 | 0.70 |
| Elongation at break (percent) | 29.9 | 34.8 |
| Modulus at 10% elongation (kg./cm.$^2$) | 14.2 | 6.6 |
| Tear strength (kg.) | 7.1 | 8.0 |
| Garley flexibility (g. cm.) | 59.7 | 43.0 |
| Young's modulus (kg./mm.$^2$) | 3.31 | 1.02 |
| Moisture-permeability (mg./cm.$^2$/hr.) | 4.2 | |

EXAMPLE 7

To 105 parts of EGA having a number average molecular weight of 1,050 and terminal hydroxyl groups dissolved in 200 parts of water-free dioxane were added 40 parts of 4,4'-diphenylmethane diisocyanate, and the reactant was maintained in nitrogen gas flow at 80° C. for 2 hours, whereafter cooled to 30° C. In the thus obtained isocyanato-terminated prepolymer, 37 parts of ethylene and 0.02 part of triethylenediamine together with 100 parts of dioxane free from water were added at once and chain-extension reaction was conducted for 3 hours. The polymer solution was cooled, pour into water to remove almost all dioxane, thereafter dried at 80° C. under reduced pressure and dissolved in N,N'-dimethylformamide to a concentration of 30% by weight. The thus obtained polymer solution had a viscosity at 30° C. of 45,000 cps.

As a solution for grain layer, 30% polyurethane solution containing 20% of a calcium carbonate and 20% of urea, each based on the polyurethane elastomer was employed and as a solution for adhesive layer, a solution having a viscosity at 30° C. of 15,000 cps. obtained by further diluting the said 30% polyurethane solution with N,N'-dimethylformamide was employed.

On a substrate of non-woven fabric comprising nylon and polyester fibers and containing 100% by weight based on the fibers of styrene-butadiene copolymer, said adhesive resin solution was laid in a finished thickness of 0.05 mm. by three reverse roll coater, subsequently whereafter broad cloth woven from mixed spun yarn of polyester fiber/cotton was superimposed thereon and said gram resin solution was further applied continuously thereon in a finished thickness of 0.3 mm. by a two reverse roll coater. The laminated material was immediately soaked in an aqueous bath at 40° C. containing 200 g./l. of sodium nitrate for about 10 minutes to coagulate the resin solution, washed with water, dried, embossed and topcoated. Thus a natural leather-like material having a moisture-permeability of 3.0 mg./cm.$^2$/hr. and coated with tough, soft film was obtained.

EXAMPLE 8

A 35% N,N'-dimethylformamide solution of polyurethane elastomer containing also 15%, based on said polyurethane, of urea was applied to the substrate material of Example 7 in a finished thickness of 0.1 mm. by a three reverse roll coater, thereafter nylon gauze was superimposed thereon and subsequently the above-mentioned polyurethane solution was further coated thereon in a finished thickness of 0.2 mm. by a two reverse roll coater. The resultant material was promptly soaked in an aqueous solution at 40° C. containing 250 g./l. of sodium sulphate and 200 g./l. of urea for approximately 10 minutes, then washed with water till said sodium sulphate and urea were completely removed, and finished in a similar manner to Example 7. Thus a tough and soft artificial leather having a microporous structure, moisture-permeability of 4.2 mg./cm.$^2$/hr. and useful for shoe uppers could be produced easily on industrial scale.

The result is given in Table 7, wherein a comparative article of the prior art obtained by sticking together a substrate and a woven fabric with an adhesive, coating a grain resin thereon and coagulating it in a so-called wet method is also shown.

TABLE 7

| | Comparative article | | The article of the present invention | |
|---|---|---|---|---|
| Thickness (mm.) | 1.54 | | 1.43 | |
| Weight (g./m.$^2$) | 1,013 | | 805 | |
| Apparent specific gravity (g./cm.$^3$) | 0.66 | | 0.56 | |
| Surface hardness | 72 | | 60 | |
| | Warp | Weft | Warp | Weft |
| Strength (kg./mm.$^2$) | 0.97 | 0.77 | 0.95 | 0.70 |
| Elongation at break (percent) | 25.3 | 32.5 | 29.9 | 34.8 |
| Modulus at 10% elongation (kg./cm.$^2$) | 16.8 | 9.5 | 14.2 | 6.6 |
| Elastic recovery at 5% elongation (percent) | 92.3 | 92.8 | 91.0 | 95.0 |
| Tear strength (kg.) | 4.0 | 5.5 | 7.1 | 8.0 |
| Garley's stiffness (cm./g.) | 89.7 | 59.2 | 59.7 | 43.0 |
| Young's modulus (kg./mm.$^2$) | 5.55 | 2.39 | 3.31 | 1.02 |
| Moisture-permeability (mg./cm.$^2$/hr.) | 1.5 | | 4.2 | |

What is claimed is:

1. A process for manufacturing a natural leather-like material, which comprises the sequential steps of: applying an organic solvent solution of a linear polyurethane resin to a substrate of non-woven fabric to form a homogeneous adhesive layer thereon, superimposing a woven fabric on the said adhesive layer, further applying homogeneously an organic solvent solution of a linear polyurethane for a grain layer to the said woven fabric while coagulation of the said adhesive layer due to elimination of the solvent substantially does not take place, thereby forming a four-layer laminate, subsequently thereafter immersing the said laminate in a liquid which is a non-solvent for the said linear polyurethane resin and which is miscible with the said organic solvent, and coagulating simultaneously the polyurethane resin in both the adhesive layer and the grain layer.

2. A process as set forth in claim 1, wherein said substrate is of a non-woven fabric finished with a synthetic butadienic rubber; said linear polyurethane resin for the adhesive layer has a relatively low average molecular weight and contains at least one ether linkage in its main molecular chain and is terminated in hydroxyl groups, which has a lower dynamic modulus of elasticity as hereinabove defined, after its coagulation as compared with that of the grain layer resin; and the other linear polyurethane for the grain layer has a relatively high average molecular weight and is terminated in alcoholic residues and free from ether linkage.

3. A process as set forth in claim 1, wherein said synthetic butadienic rubber is a styrene/butadiene copolymer or an acrylonitrile/butadiene copolymer.

4. A process as set forth in claim 2, wherein said polyurethane resin for adhesive solutions has a dynamic modulus of elasticity of $3.0 \times 10^8 - 1.0 \times 10^9$ dyne/cm.$^2$, said polyurethane resin for grain layer has a dynamic modulus of elasticity of $4.0 \times 10^8 - 1.5 \times 10^9$ dyne/cm.$^2$ and the difference of those values being at least $1.0 \times 10^8$ dyne/cm.$^2$.

5. A process as set forth in claim 2, wherein said polyurethane resin for adhesive layer has a dynamic modulus of elasticity of $3.7 \times 10^8 - 5.0 \times 10^8$ dyne/cm.$^2$, said polyurethane resin for grain layer has a dynamic modulus of elasticity of $5.0 \times 10^8 - 7.5 \times 10^8$ dyne/cm.$^2$. and the difference of those values being at least $1.0 \times 10^8$ dyne/cm.$^2$.

6. A process as set forth in claim 1, wherein said adhesive solution has a viscosity at 30° C., based on a concentration of 35%, of 8,000–130,000 cps., and said grain resin solution has a viscosity at 30° C., based on a concentration of 35%, of 50,000–200,000 cps.

7. A process as set forth in claim 2, wherein said adhesive solution has a viscosity at 30° C., based on a concentration of 35%, of 20,000–100,000 cps., and said grain resin solution has viscosity at 30° C., based on a concentration of 35%, of 70,000–150,000 cps.

8. A process as set forth in claim 2, wherein said polyurethane for grain layer is prepared by a reaction of: a polyester glycol having an average molecular weight of 1,000–3,000 obtained from ethylene glycol or ethylene glycol/propylene glycol and adipic acid; an organic diisocyanate; and ethylene glycol or tetramethylene glycol; said reaction being stopped by a monoalcohol.

9. A process as set forth in claim 2, wherein said polyurethane of adhesive resin solution is prepared by a reaction of a polyether polyol having an average molecular weight of 1,000–3,000, an organic diisocyanate, and 1,4-tetramethylene glycol, said reaction being stopped by a glycol.

10. A process as set forth in claim 1, wherein said liquid is of an aqueous inorganic salt solution or aqueous solution of an inorganic salt and urea or thiourea.

11. A process as set forth in claim 1, wherein said adhesive solution of a linear polyurethane resin contains additionally urea, thiourea, sodium sulphate or sodium chloride.

References Cited

UNITED STATES PATENTS 3,284,274   11/1966   Hulslander et al. _____ 161—159

WILLIAM A. POWELL, Primary Examiner

U.S. Cl. X.R.

117—62; 156—305, 324; 161—88

UNITED STATES PATENT OFFICE
CERTIFICATE OF CORRECTION

Patent No. 3,778,325   Dated December 11, 1973

Inventor(s) Saburo Oohara, Koitsuro Amemiya, Yasushi Nishijima, Mitsuyoshi Fukushima and Kunio Shimizu It is certified that error appears in the above-identified patent and that said Letters Patent are hereby corrected as shown below:

In the heading insert the following:

---Foreign Application Priority Data

Aug. 14, 1969   Japan .......... 64283/69

Mar. 12, 1970   Japan .......... 21069/70 ---.

Signed and sealed this 14th day of May 1974.

(SEAL)
Attest:

EDWARD M. FLETCHER, JR.        C. MARSHALL DANN
Attesting Officer              Commissioner of Patents